United States Patent
Taira et al.

(10) Patent No.: US 8,824,521 B2
(45) Date of Patent: Sep. 2, 2014

(54) SOLID LASER APPARATUS

(75) Inventors: Takunori Taira, Okazaki (JP); Weipeng Kong, Okazaki (JP)

(73) Assignee: Inter-University Research Institute Corporation National Institutes of Natural Sciences, Tokyo (JP)

( * ) Notice: Subject to any disclaimer, the term of this patent is extended or adjusted under 35 U.S.C. 154(b) by 0 days.

(21) Appl. No.: 14/237,308

(22) PCT Filed: Aug. 1, 2012

(86) PCT No.: PCT/JP2012/004890
§ 371 (c)(1),
(2), (4) Date: Feb. 5, 2014

(87) PCT Pub. No.: WO2013/021585
PCT Pub. Date: Feb. 14, 2013

(65) Prior Publication Data
US 2014/0169395 A1    Jun. 19, 2014

(30) Foreign Application Priority Data
Aug. 5, 2011    (JP) .................................. 2011-171664

(51) Int. Cl.
*H01S 3/06*    (2006.01)
*H01S 3/094*    (2006.01)

(52) U.S. Cl.
CPC .............................. *H01S 3/094049* (2013.01)
USPC .................. 372/67; 372/71; 372/75; 372/41; 372/36

(58) Field of Classification Search
USPC ..................... 372/67, 71, 75, 41, 36
See application file for complete search history.

(56) References Cited

U.S. PATENT DOCUMENTS

| | | | |
|---|---|---|---|
| 6,373,864 B1 * | 4/2002 | Georges et al. ................. | 372/10 |
| 6,587,488 B1 * | 7/2003 | Meissner et al. ........... | 372/29.01 |
| 8,509,273 B2 * | 8/2013 | Schlie et al. .................... | 372/34 |
| 2003/0161375 A1 * | 8/2003 | Filgas et al. .................... | 372/66 |

FOREIGN PATENT DOCUMENTS

| | | |
|---|---|---|
| JP | A-4-356983 | 12/1992 |
| JP | A-8-148739 | 6/1996 |
| JP | A-2006-134960 | 5/2006 |
| JP | A-2009-182232 | 8/2009 |
| JP | A-2010-135704 | 6/2010 |

OTHER PUBLICATIONS

Giesen et al., "Scalable Concept of Diode-Pumped High-Power Solid-State Lasers", *Appl. Phys. B*, 1994, pp. 365-372, vol. 58.

(Continued)

*Primary Examiner* — Kinam Park
(74) *Attorney, Agent, or Firm* — Oliff PLC (57) ABSTRACT

A solid laser apparatus which includes: two reflection elements for forming an oscillator; a plate-shaped gain medium being disposed between the two reflection elements, thereby augmenting a stimulated emission light in a thickness-wise direction; a doughnut- or deformed-doughnut-type planar waveguide being disposed so as to make an inner peripheral face thereof come in contact with an outer peripheral face of the plate-shaped gain medium; and a plurality of excited-light sources being directed in five or more directions, the excited-light sources being coupled to an outer peripheral face of the doughnut- or deformed-doughnut-type planar waveguide so as to make excited lights propagate from the outer peripheral face of the doughnut- or deformed-doughnut-type planar waveguide to the plate-shaped gain medium.

12 Claims, 7 Drawing Sheets

(56) References Cited

OTHER PUBLICATIONS

Zapata et al., "High Average Power Yb: YAG Laser", *Solid State and Diode Laser Technology Review*, May 23, 2001.
Tsunekane et al., "High-Power Operation of Diode Edge-Pumped, Glue-Bonded, Composite Yb:$Y_3Al_5O_{12}$ Microchip Laser with Ceramic, Undoped YAG Pump Light-Guide", *Japanese Journal of Applied Physics*, Sep. 2, 2005, pp. L1164-L1167, vol. 44, No. 37.
International Search Report issued in International Application No. PCT/JP2012/004890, mailed Oct. 23, 2012 (with translation).
International Preliminary Report on Patentability issued in International Application No. PCT/JP2012/004890 issued Nov. 6, 2013 (with translation).

* cited by examiner

SOLID LASER APPARATUS

TECHNICAL FIELD

The present invention relates to a solid laser apparatus that can generate high-power lasers with higher efficiency.

BACKGROUND ART

Recently, YAG (e.g., $Y_3Al_5O_{12}$) crystals with rare-earth ions doped, like Yb:YAG, have become popular as a high-power laser medium, especially, as a high-power short-pulse laser medium. In particular, it is because Yb-based laser media have quantum defects less (e.g., 8.7% in the case of Yb:YAG) and have a wider band width for oscillation. These characteristics make it possible to use high-performance semiconductor lasers for excited-light source.

Meanwhile, since laser media with a certain type of rare-earth ions, such as Yb, doped have an energy level of the quasi 4 level structure, it is necessary to overcome the reabsorption at lower laser level and the small stimulated-emission cross section in order to cause them to oscillate. In addition, it is also important to cause the excited-light distribution to match to the space-distribution pattern (i.e., traverse mode) of oscillatory-light distribution in order to achieve satisfactory laser efficiencies. It is because laser lights are absorbed intensely by areas that are excited weakly in the laser (or gain) medium within a laser oscillator. In addition, the laser performance is sensitive to the temperatures of crystal.

For high-power Yb-based lasers, such as Yb:YAG, whose efficiency is good, active-mirror laser structures including thin disks or microchips are one of the appropriate designs. It is because these structures can not only decrease the thermal lens effect but also suppress the temperature rise in gain medium. In addition, since the light-path length of laser beam within the gain medium is short in the case of the active-mirror laser structures, the reabsorption loss can be minimized. However, there is such a problem that it is difficult for such a thin gain medium to achieve efficient excited-light absorptions.

A. Giesen, et al., have so far attained sufficient excited-light absorptions by means of reflecting excited lights 16 times repeatedly between laser crystals and plurality of mirrors being fixated in front of the laser crystals with use of a colinear excitation constitution that is similar to the end-face excitation (see Non-patent Literature No. 1, for instance).

However, the laser apparatus of A. Giesen, et al., had such a problem that the constitution was very complicated. Hence, Luis E. Zapata, et al., developed in order to solve that problem a solid laser apparatus in which $Yb^{3+}$:YAG with 200-μm thickness was formed onto a quadrangular-prism-shaped clad with 1.3-mm thickness, thereby causing excited lights, which came from the resulting stacked-type semiconductor laser, to undergo wave guiding from the longitudinal direction of the clad (see Non-patent Literature No. 2, for instance).

In the laser apparatus of Luis E. Zapata, et al., however, the excited lights coming from the semiconductor laser propagate mainly in the thick undoped YAG plate, and accordingly only some of the excited lights are absorbed in the thin Yb:YAG gain medium. Consequently, it is impossible for the gain medium to absorb the intense excited lights that come from the semiconductor laser.

Meanwhile, side-face excitation core-doped microchip lasers solve those problems. An excited light, which has been introduced into the microchip from one of the side faces, propagates through a transparent planar waveguide by means of total reflection without any loss, and then converges onto the central Yb:YAG core area. Since the diameter of the core is several millimeters, most of the excitation energy, which passes through the core diametrically, is absorbed effectively even by one-way excitation. Moreover, since the excitation constitution is so simple that it is not necessary to insert the optical system for excitation in front of the microchip, the degree of freedom is high in designing the laser oscillator.

M. Tsunekane, et al., developed a side-face excitation core-doped microchip laser apparatus (see Non-patent Literature No. 3, for instance). This laser apparatus is one in which a disk-shaped gain medium, which is mounted on the central portion of a rectangle-shaped planar waveguide, is excited by excited lights, which come from a stacked-type semiconductor laser, through the four side faces of the rectangle-shaped planar waveguide.

RELATED TECHNICAL LITERATURE

Non-Patent Literature

Non-patent Literature No. 1: A. Giesen, et al., "Scalable Concept for Diode-Pumped High-Power Solid-State Lasers," App. Phys. B, 58, pp. 365-372 (1996);

Non-patent Literature No. 2: Luis E. Zapata, et al., "High Average Power Yb:YAG Laser," Solid State and Diode Laser Technology Review-2001, Conference, Air Force Research Laboratory, Albuquerque, N. Mex., May 23, 2001; and Non-patent Literature No. 3: Masaki Tsunekane, et al., "High-Power Operation of Diode Edge-Pumped, Glue-Bonded, Composite $Yb:Y_3Al_5O_{12}$ Microchip Laser with Ceramic, Undoped YAG Pump Light-Guide," Japanese Journal Applied Physics, Vol. 44, No. 37, 2005, pp. L1164-L1167

SUMMARY OF THE INVENTION

Assignment to be Solved by the Invention

Figure 9A:
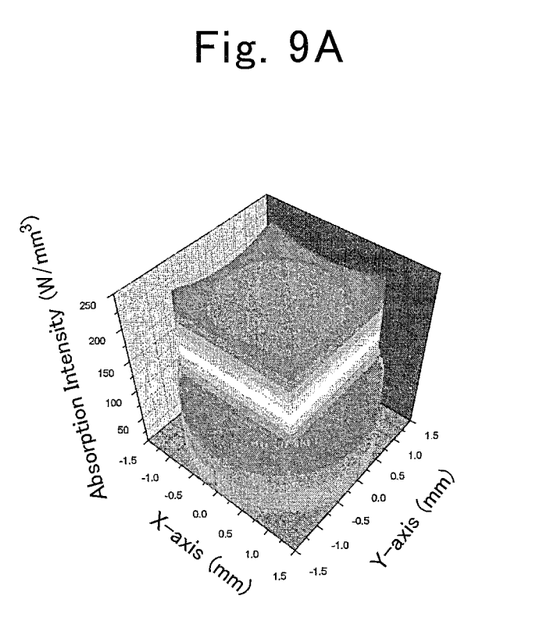
FIG. 9A is a three-dimensional representation of a distribution of excited-light intensities in a conventional solid laser apparatus.
Figure 9B:
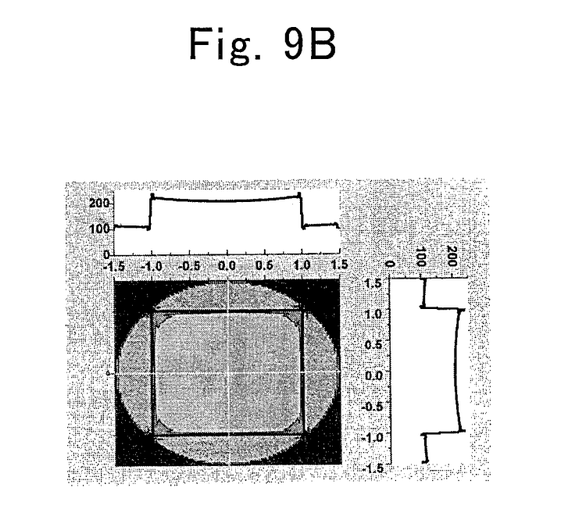
FIG. 9B is a two-dimensional representation of the distribution of excited-light intensities in the conventional solid laser apparatus.

In the aforementioned conventional side-face excitation core-doped microchip laser apparatus, because excited lights are caused to undergo wave guiding through the four side faces of the rectangle-shaped planar waveguide in order to excite the central core-doped gain medium, a space distribution of intensities of the absorbed excited lights turns into a top hat-type uniform excitation as shown in FIG. 9A and FIG. 9B. As a result, in the case of lower-level mode excitation, especially, in the case of single mode excitation (e.g., $TEM_{00}$ mode in which a space distribution of laser beam shows the basic Gaussian distribution type), the excited lights cannot be converted into laser oscillation efficiently, and thereby it is not possible to generate high-luminance lasers efficiently.

Moreover, because, of lower-level modes, the combination of $TEM_{01}$ modes results in a doughnut-shaped space distribution, it is useful for laser tweezers (that is, capturing fine or micro objects with laser), and so on. However, it is not possible for the conventional side-face excitation core-doped microchip laser apparatus to generate $TEM_{01}$ modes efficiently.

Moreover, in order to cause excited lights to undergo wave guiding through the four faces of the rectangle-shaped planar waveguide, it is necessary to focus the excited lights, which come from the stacked-type semiconductor laser, by two cylindrical lenses, which bisect one another at right angles, to make the conventional side-face excitation core-doped microchip laser apparatus produce high powers. Consequently, the resulting sold laser apparatus has become larger in size as a whole.

The present invention is one which has been done in view of the problems of the aforementioned conventional solid laser apparatuses. It is an assignment to it to provide a compact solid laser apparatus that can generate low-order-mode (such as $TEM_{00}$- or $TEM_{01}$-mode) high-power lasers highly efficiently, and which does not need any complicated optical system for excitation.

Means for Solving the Assignment

A solid laser apparatus according to the present invention, which has been done in order to solve the above-mentioned assignment, is characterized in that:

the solid laser apparatus comprises:

two reflection elements for forming an oscillator;

a plate-shaped gain medium being disposed between said two reflection elements, thereby augmenting a stimulated emission light in a thickness-wise direction;

a doughnut- or deformed-doughnut-type planar waveguide being disposed so as to make an inner peripheral face thereof come in contact with an outer peripheral face of said plate-shaped gain medium; and a plurality of excited-light sources being directed in five or more directions, the excited-light sources being coupled to an outer peripheral face of said doughnut- or deformed-doughnut-type planar waveguide so as to make excited lights propagate from the outer peripheral face of said doughnut- or deformed-doughnut-type planar waveguide to said plate-shaped gain medium.

Since it is possible to dispose a large number of the excited-light sources onto the outer periphery of the doughnut- or deformed-doughnut-type planar waveguide, and since no complicated optical system for excitation is required, it is possible for the resulting compact solid laser apparatus to generate high-power lasers.

In the above-mentioned solid laser apparatus, it is allowable that the excited lights coming from said plurality of excited-light sources being directed in five or more directions can be caused to fall on (or incidented on) the outer peripheral face of said doughnut- or deformed-doughnut-type planar waveguide at such an angle that turns a space distribution of absorption intensities of said excited lights resulting from said plate-shaped gain medium into a shape of Gaussian distribution that approximates a $TEM_{00}$ mode.

Since the excited lights are caused to fall through the outer peripheral face of the doughnut- or deformed-doughnut-type planar waveguide at such an angle that turns a space distribution of intensities of the excited lights, which have been absorbed by the gain medium, into a shape of Gaussian distribution, it is possible to generate $TEM_{00}$-mode (or high-luminance) lasers efficiently.

Moreover, it is allowable that the excited lights coming from said plurality of excited-light sources being directed in five or more directions can be caused to fall on the outer peripheral face of said doughnut- or deformed-doughnut-type planar waveguide at such an angle that turns a space distribution of absorption intensities of said excited lights resulting from said plate-shaped gain medium into a shape of doughnut distribution that approximates a $TEM_{01}$ mode.

Since the excited lights are caused to fall through the outer peripheral face of the doughnut- or deformed-doughnut-type planar waveguide at such an angle that turns a space distribution of intensities of the excited lights, which have been absorbed by the gain medium, into a shape of doughnut distribution, it is possible to generate $TEM_{01}$-mode lasers efficiently.

Moreover, it is allowable that the present solid laser apparatus can further comprise an angle changing means for changing an incident angle of the excited lights coming from said excited-light sources toward the outer peripheral face of said doughnut- or deformed-doughnut-type planar waveguide.

The above constitution makes the switching between $TEM_{00}$-mode laser oscillations and $TEM_{01}$-mode laser oscillations easy.

Moreover, it is allowable that said plate-shaped gain medium can be made by doping a predetermined area in a disk-shaped host material with active ions.

Since an undoped area of the disk-shaped host material turns into a planar waveguide, and since reflection losses disappear at the interface between the resulting planar waveguide and the gain medium, it is possible to make the present solid laser apparatus highly efficient.

Moreover, it is allowable that said excited-light sources can be a semiconductor-chip laser, respectively.

Since a semiconductor-chip laser can be cooled directly by a heatsink, it is possible to directly bond a laser-outgoing (or active-area) end face of the semiconductor-chip laser, which is disposed on the heatsink, to the outer peripheral face of the doughnut-type planar waveguide. As a result, it is possible to make the present solid laser apparatus more compact.

Moreover, it is allowable that:

said plate-shaped solid gain medium can have a thickness of less than 1,000 μm;

a total-reflection element, one of two reflection elements, can be formed on one of facing opposite planes of said plate-shaped gain medium; and an outer face of said total-reflection element can be brought into contact with a heatsink.

The above constitution makes an active-mirror laser structure, and thereby it is possible not only to decrease the thermal lens effect but also to suppress temperature rises in the gain medium. As a result, it is much more possible to generate high-power lasers highly efficiently.

Effect of the Invention

Since it is possible to dispose a large number of the excited light sources onto the outer periphery of the doughnut- or deformed-doughnut-type planar waveguide, and since no complicated optical system for excitation is required, it is possible for the resulting compact solid laser apparatus to generate high-power lasers.

MODE FOR CARRYING OUT THE INVENTION

Embodiment Mode No. 1

As illustrated in FIGS. 1 through 5, a solid laser apparatus according to the present embodiment mode is equipped with: two reflection elements (1a, 1b) for forming an oscillator; a plate-shaped gain medium 2 being disposed between the two reflection elements (1a, 1b), thereby augmenting a stimulated emission light in a thickness-wise direction; a planar waveguide 3 being disposed so as to make an inner peripheral face thereof come in contact with an outer peripheral face of the plate-shaped gain medium 2; and a plurality of excited-light sources 4a being coupled to an outer peripheral face of the planar waveguide 3 so as to make excited lights propagate from the outer peripheral face of the planar waveguide 3 to the plate-shaped gain medium.

As for the plate-shaped gain medium 2, it is possible to use rare-earth vanadates being doped with rare-earth ions, apatite, single crystals or ceramics resulting from fluorides, and the other semiconductors, for instance. In the present embodiment mode, YAG (e.g., $Y_3Al_5O_{12}$) being doped with rare-earth ions was used. Since the rare-earth-doped YAG has quantum defects less and exhibits a wider bandwidth for oscillation, it is feasible to make it produce higher powers. Moreover, although the following is applicable to rare-earth-doped vanadates being doped with rare-earth ions as well, since the excitation wavelength lies in the near-infrared region, it is possible to employ small-sized and high-power semiconductor lasers for the excited-light sources.

In the present embodiment mode, Yb:YAG, in which Yb was doped in an amount of 10 atomic %, was used as the plate-shaped gain medium 2. The plate-shaped gain medium 2 was a disk (or chip) whose thickness was 0.2 mm and diameter was 3 mm.

A film with a high reflectivity (e.g., a reflectivity, "R,">99%) was formed on one of the faces of the opposite facing faces in the plate-shaped gain medium 2. This film is the reflection element 1a for forming an oscillator. The film can be a dielectric multilayered film whose thickness is on the order of laser oscillatory wavelength, for instance.

The reflection element 1b for taking out output was a film being formed on a quartz plate, and that film had an 80% reflectivity with respect to lights with a predetermined oscillatory wavelength (i.e., a transmissivity, "T,"=20%). The film can be a dielectric multilayered film whose thickness is on the order of laser oscillatory wavelength, for instance.

Figure 1:
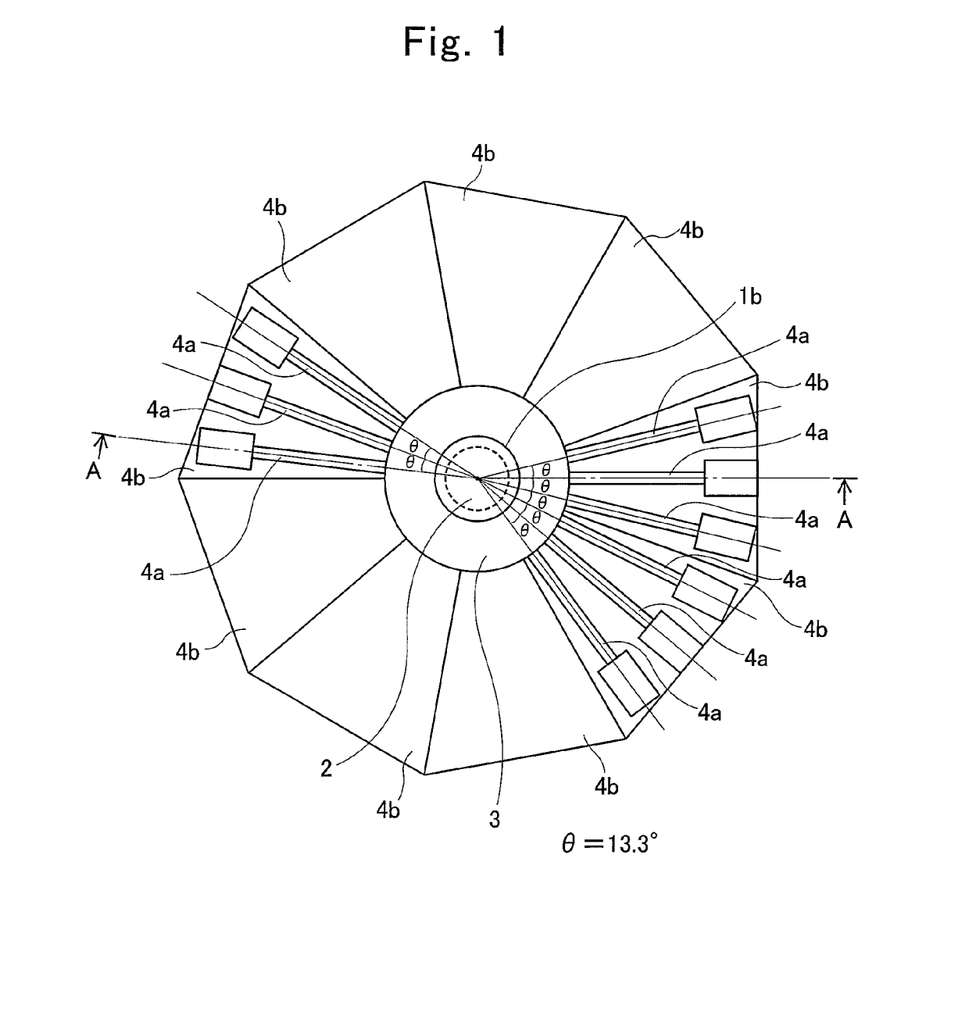
FIG. 1 is a top-view diagram of a solid laser apparatus according to the present invention that is directed to Embodiment Mode No. 1.
Figure 2:
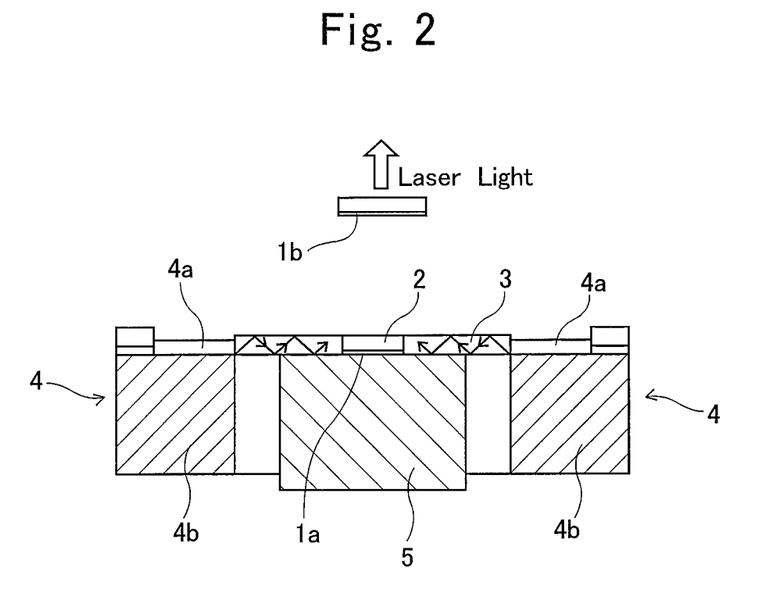
FIG. 2 is a cross-sectional diagram being taken along the line "A"-"A" in FIG. 1.

As illustrated in FIG. 1, although the planar waveguide 3 according to the present embodiment mode was a doughnut-type planar waveguide whose outer peripheral circle and inner peripheral circle were concentric circles one another, the outer peripheral circle and/or the inner peripheral circle cannot yet be a true circle; but can even be an ellipse, respectively. That is, the planar waveguide 3 can be either a doughnut- or deformed-doughnut-type planar waveguide.

The doughnut-type planar waveguide 3 can be made of a material that is transparent to the lights with the wavelengths of excited light; for example, it can also be made of a quarts glass plate. Preferably, it can be made of a material whose refractive index is identical with that of the plate-shaped gain medium. When the doughnut-type planar waveguide 3 is made of a material whose refractive index is identical with that of the plate-shaped gain medium 2, it is possible to suppress reflection losses at the interface. Since the plate-shaped gain medium 2 was made of Yb:YAG in the present embodiment mode, YAG being free from doped Yb was used as the doughnut-type planar waveguide 3. The thickness of the doughnut-type planar waveguide 3 was 0.2 mm that was the same as that of the plate-shaped gain medium 2, the inside diameter was 3 mm that was the same as that of the plate-shaped gain medium 2, and the outside diameter was 8.52 mm.

It is allowable to insert the plate-shaped solid gain medium 2 into the central opening portion of the doughnut-type planar waveguide 3 and then subject them to diffusion joining. Preferably, the making can be carried out as follows.

First of all, a hybrid composite laser rod (e.g., a rod whose center cylindrical core with 3-mm diameter was made of 10-atomic-% Yb:YAG single crystal or ceramic, and in which that core was surrounded by an undoped YAG ceramic clad with 10-mm diameter) was made. Next, a disk, whose diameter was 8.52 mm and thickness was 0.2 mm, was made out of that hybrid composite laser rod. As for such a hybrid composite laser rod, it is possible to employ those produced by KAMISHIMA KAGAKU Co., Ltd., for instance.

In the case of the disk with 8.52-mm diameter and 0.2-mm thickness that was made out of the hybrid composite laser rod, since there was no reflection loss at the interface between the doughnut-type planar waveguide 3 and the plate-shaped gain medium 2, it was possible to make the resulting disk highly efficient.

The plate-shaped gain medium 2 and doughnut-type planar waveguide 3 were joined onto a water-cooled copper heatsink 5 at their bottom faces (i.e., the face on which the reflection element 1a was formed) by a thermal conductive adhesive, or by a solder material that included an Au/Sn alloy. Therefore, heats generating in the plate-shaped gain medium 2 with 0.2-mm thickness flowed to the heatsink 5 by way of the reflection element 1a on the bottom faces. Thus, they made an active-mirror lens structure, and thereby it was possible not only to decrease the thermal lens effect, but also to suppress temperature rises in the plate-shaped gain medium 2. As a result, it was possible to generate high-power lasers highly efficiently.

As for the excited-light sources 4a, it is possible to use any of the following: Kr arc lamps, LEDs (or light-emitting diodes), LDs (or semiconductor lasers), and the like. The excited-light sources 4a can preferably be an LD, respectively. Compared with Kr arc lamps and LEDs, it is possible for LDs to emit a coherent light with wavelength that matches to the absorption wavelength of the gain medium 2. Matching the wavelength of the excited lights to the absorption wavelength of the gain medium 2 leads to making it possible to heighten the laser-oscillation efficiency (i.e., output power/input power). When the excited lights are coherent, it is possible to irradiate the gain medium 2 with the excited lights efficiently by a simple optical system.

In particular, in the case of a bare chip-type LD like a semiconductor chip laser, since it is allowable to bring the laser-outgoing face into contact directly with the outer peripheral face of the doughnut-type planar waveguide 3 (see FIGS. 1 and 2), any complicated optical system for excitation is unnecessary, and thereby it is possible to make the resulting apparatus compacter as a whole. In the present embodiment mode, bear chip-type LDs 4a were coupled to the outer peripheral face of the doughnut-type planar waveguide 3 in the peripheral direction in a quantity of 27 pieces at substantially equal intervals (e.g., apart by about 13.3 degrees).

Note that, as to the disposition of the excited-light sources 4a, it is allowable to dispose them at unequal intervals, other than coupling each one of them so as to make equal intervals between them.

The laser-outgoing end face (whose thickness was 0.125 mm and width was 0.5 mm) of the bare chip-type LDs 4a was disposed to face the outer peripheral face of the doughnut-type planar waveguide 3 with a 100-μm clearance provided therebetween. The 100-μm gaps were for preventing the laser-outgoing end faces from coming in contact with the outer peripheral face of the doughnut-type planar waveguide 3 to be damaged. Since reflection losses increase when the 100-μm gaps are present, it is allowable to fill up the gaps with a matching oil, and the like, or to perform AR coating onto the end faces, in order to inhibit the reflection losses.

Figure 3:
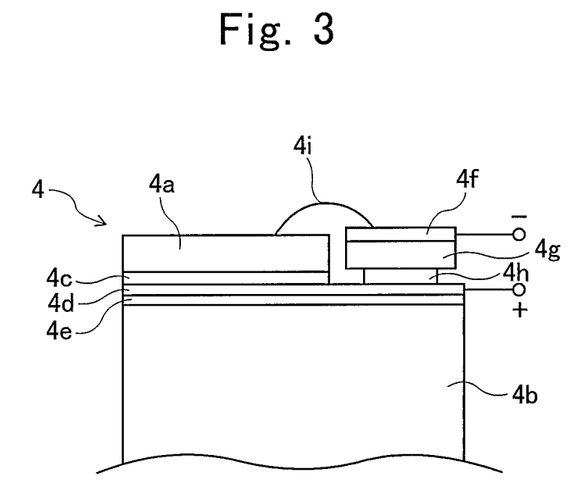
FIG. 3 is a detailed cross-sectional diagram of an excited-light source unit in FIG. 2.

As illustrated in FIG. 3, an excited-light source unit 4 according to the present embodiment mode was one in which the bare chip-type LDs 4a were joined to a Cu—W water-cooled heatsink 4b, respectively. 4c was an Au—Sn solder with 5-μm thickness. 4d was Au with 0.1-μm thickness. 4e was Ni with 3-μm thickness. 4g was an insulation plate (e.g., a ceramic plate with 1-mm thickness) which was joined to 4d by way of an Au layer 4h with 8-μm thickness. An Au film 4f with 8-μm thickness was formed on the insulation plate 4g; the Au film 4f, and the negative electrode of the bare chip-type LDs 4a were connected by a bonding wire 4i.

Figure 4:
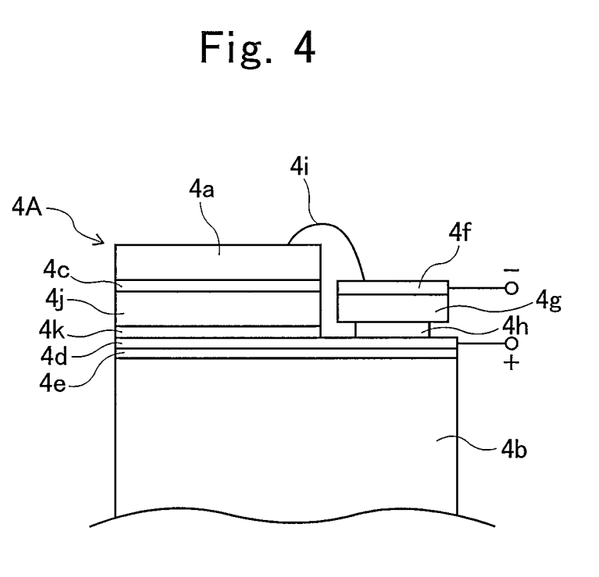
FIG. 4 is a cross-sectional diagram of an excited-light source unit that is directed to a modified embodiment mode.

It is allowable that an excited-light source unit 4A according to a modified embodiment mode shown in FIG. 4 can substitute for the excited-light source unit 4. The excited-light unit 4A according to the modified embodiment mode differs greatly from the excited-light source unit 4 according to the present embodiment mode in that a Cu—W submount 4j is interposed between 4c and 4d in the excited-light source unit 4. Note that 4k is an Sn—Ag—Cu solder.

The excited-light source unit 4A was equipped with the Cu—W submount 4j between 4c and 4d. That is, in the excited-light source unit 4A, since the bare chip-type LDs 4a were joined to the Cu—W water-cooled heatsink 4b after being mounted onto the Cu—W submount 4j having a smaller volume, strains in the bare chip-type LDs 4a could be inhibited.

Figure 5A:
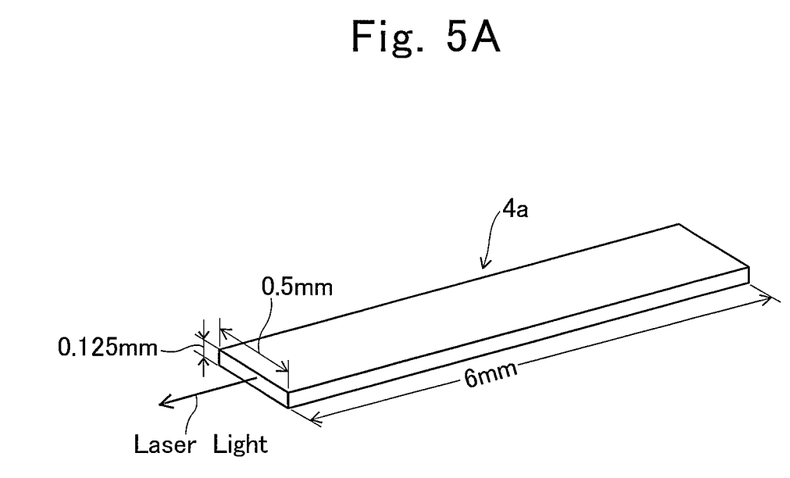
FIG. 5A is a perspective-view diagram of the excited-light source unit in FIG. 3.
Figure 5B:
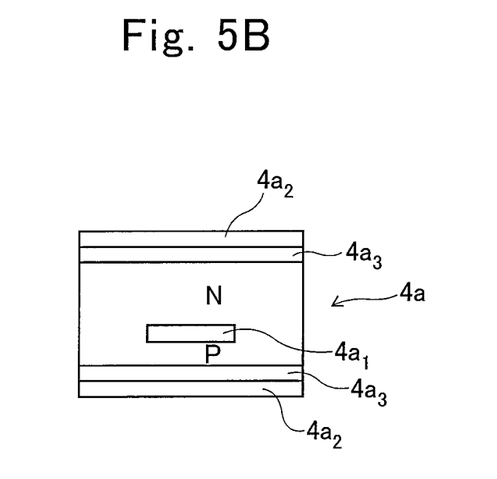
FIG. 5B is an end-view diagram of the excited-light source unit in FIG. 3.

The bare chip-type LDs 4a were a product of OPTOENERGY INC. whose model number was "94004112." As illustrated in FIG. 5A and FIG. 5B, the bare chip-type LDs 4a were a rectangular parallelepiped whose thickness was 0.125 mm, width was 0.5 mm and length was 6 mm, respectively, and in which $4a_1$ was an active layer, $4a_2$ was an Au layer (or electrode) and $4a_3$ was a Ti/Pt layer. The product of OPTOENERGY INC. whose model number was "94004112" outputted a 12 W multi-mode laser having a wavelength of 940 nm.

From the solid laser apparatus according to Embodiment Mode No. 1 that is directed to the present invention with the aforementioned constitution, 98 W CW laser power (with 30% efficiency) was obtained in the single mode, whereas 130 W CW laser power (with 40% efficiency) was obtained in the multi mode.

Figure 6A:
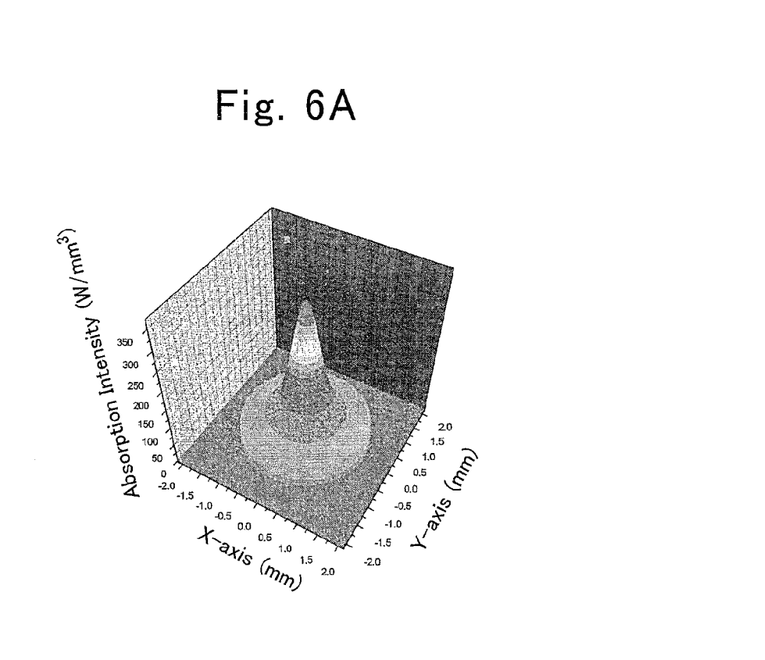
FIG. 6A is a three-dimensional representation of a distribution of intensities of excited lights being absorbed by a plate-shaped gain medium in the solid laser apparatus according to Embodiment Mode No. 1.
Figure 6B:
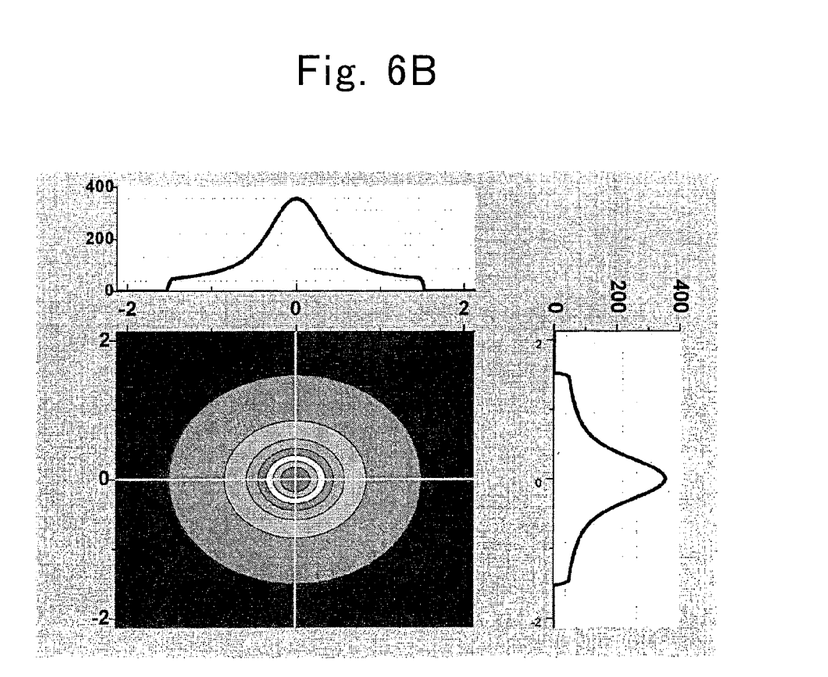
FIG. 6B is a two-dimensional representation of the distribution of intensities of excited lights being absorbed by the plate-shaped gain medium in the solid laser apparatus according to Embodiment Mode No. 1.

FIG. 6A, and FIG. 6B show a space distribution of intensities of excited lights that were absorbed by the gain medium 2 of the solid laser apparatus according to the present embodiment mode, respectively. Since it is difficult to actually measure the space distribution of the excited lights that have been absorbed by the gain medium 2, they are the ones that were obtained by means of a simulation experiment. That is, FIG. 6A and FIG. 6B were those which were found by making such a simulation that the excited lights whose beam size was 0.1×0.01 mm$^2$ and power was 324 W (=12 W×27) in total were shed from 27 directions toward the center of the gain medium 2 whose absorption coefficient was 0.6 mm$^{-1}$.

It is understood from FIG. 6A and FIG. 6B that the space distribution of intensities of the absorbed excited lights was the Gaussian type. Therefore, it can be construed that the intensity distribution of the excited lights matched better to the space-distribution pattern of the intensity distribution of the single-mode oscillatory lights so that it was possible to generate the 98 W laser power with a conversion efficiency of 0.3 (=98 W/324 W) in the single mode.

The simulation experiment was also carried out not only for the case of shedding 36 W excited lights from three directions, but also for the case of shedding 108 W excited lights from nine direction. As a result, it was understood that, as the number of the directions of shedding the excited lights increases, the space distribution of intensities of the excited lights being absorbed by the gain medium 2 approaches the Gaussian type. It was understood that, when shedding the excited lights from 10 directions or more at least, the resulting space distribution approaches the Gaussian type more. Therefore, the excited lights can preferably be shed from the excited-light sources being directed in five or more directions, or can more preferably be shed from the excited-light sources being directed in 10 or more directions.

Although the plate-shaped gain medium 2 according to the present embodiment mode was a disk, it can also be rectangular plates, or can even be octagonal plates. Moreover, it is even permissible that the plate-shaped gain medium 2 cannot be positioned at the center of the doughnut-type planar waveguide 3.

Embodiment Mode No. 2

Figure 7:
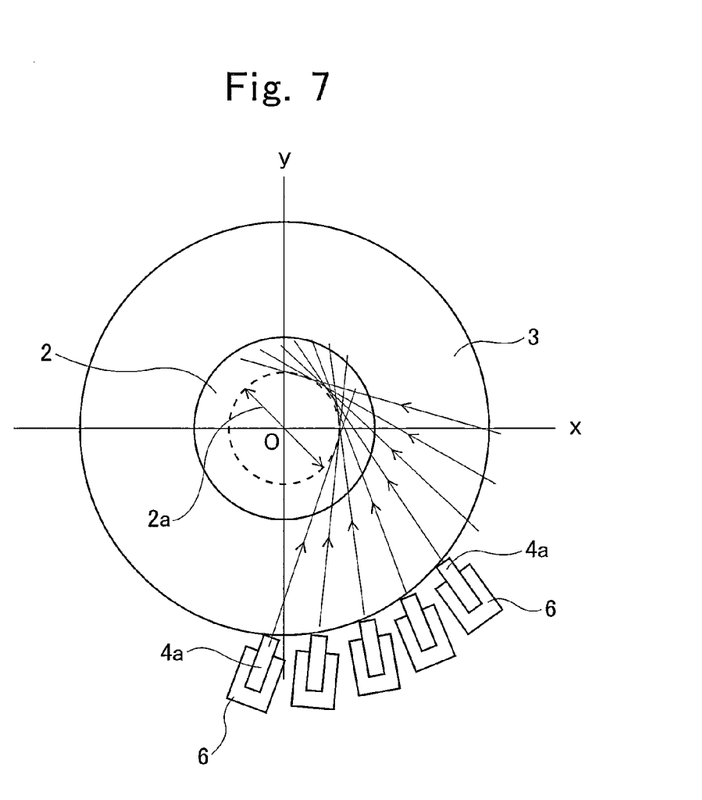
FIG. 7 is a top-view diagram of a major portion in a solid laser apparatus according to Embodiment Mode No. 2.

As illustrated in FIG. 7, a solid laser apparatus according to the present embodiment mode further comprised angle changing means 6 for changing the incident angles of the excited lights coming from the excited-light sources 4a onto the outer peripheral face of the doughnut-type planar waveguide 3.

Figure 8:
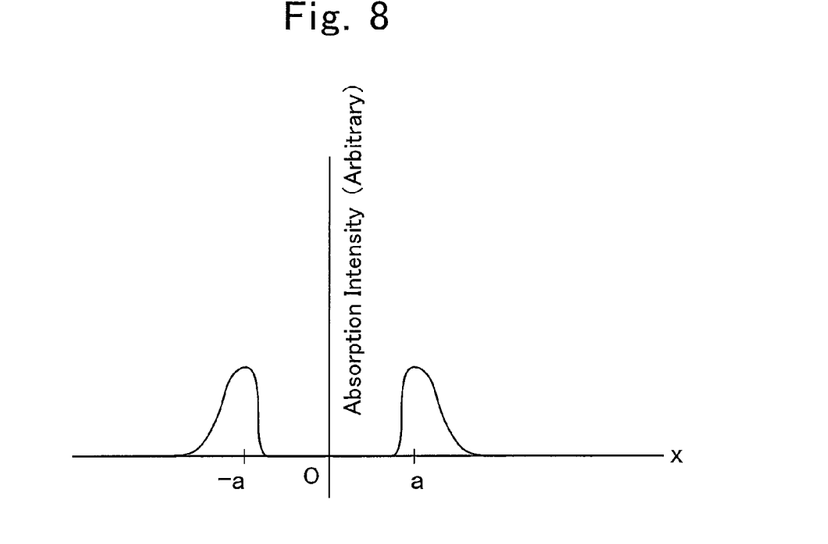
FIG. 8 is a distribution of excited-light intensities in the solid laser apparatus according to Embodiment Mode No. 2.

The angle changing means 6 can respectively be a gonio stage, for instance. The incident angles of the excited lights coming from the excited-light sources 4a were controlled by the gonio stages 6, and accordingly the excited lights were shed so as to be tangential to an imaginary circle with a diameter 2a that is smaller than the outside diameter of the plate-shaped gain medium 2. Then, the resulting envelope curves of the excited lights (or the lines) made a circumference with the diameter 2a, and thereby a space distribution of intensities of the excited lights being absorbed by the gain medium 2 turned into a doughnut type as shown in FIG. 8. Therefore, the solid laser apparatus according to the present embodiment mode could generate TEM$_{01}$-mode lasers efficiently.

Since the solid laser apparatus according to the present embodiment mode was equipped with the angle changing means 6, it was easy for it to make a space distribution of intensities the excited lights into the Gaussian type like the one in Embodiment Mode No. 1. For example, even in a case where the excited-light sources are disposed at unequal intervals, setting up the incident angle from each of the excited-light sources properly leads to making it possible to control a space distribution of intensities of the excited lights properly.

EXPLANATION ON REFERENCE NUMERALS (1a, 1b): Two Reflection Elements for Forming Oscillator;
2: Disk-shaped Solid Gain Medium;
3: Doughnut- or Deformed-doughnut-type Planar Waveguide;
4a: Excited-light Source;
5: Heatsink; and
6: Angle Changing Means

The invention claimed is:

1. A solid laser apparatus wherein the solid laser apparatus comprises:
   two reflection elements for forming an oscillator;
   a plate-shaped gain medium being disposed between said two reflection elements, thereby augmenting a stimulated emission light in a thickness-wise direction;
   a doughnut- or deformed-doughnut-type planar waveguide being disposed so as to make an inner peripheral face thereof come in contact with an outer peripheral face of said plate-shaped gain medium; and
   a plurality of excited-light sources being directed in five or more directions, the excited-light sources being coupled to an outer peripheral face of said doughnut- or deformed-doughnut-type planar waveguide so as to make excited lights propagate from the outer peripheral face of said doughnut- or deformed-doughnut-type planar waveguide to said plate-shaped gain medium;
   wherein the excited lights coming from said plurality of excited-light sources being directed in five or more directions are caused to fall on the outer peripheral face of said doughnut- or deformed-doughnut-type planar waveguide at such an angle that turns a space distribution of absorption intensities of said excited lights resulting from said plate-shaped gain medium into a shape of doughnut distribution that approximates a TEM01 mode.

2. A solid laser apparatus wherein the solid laser apparatus comprises:
   two reflection elements for forming an oscillator;
   a plate-shaped solid gain medium being disposed between said two reflection elements, thereby augmenting a stimulated emission light in a thickness-wise direction;
   a doughnut- or deformed-doughnut-type planar waveguide being disposed so as to make an inner peripheral face thereof come in contact with an outer peripheral face of said plate-shaped gain medium; and
   27 pieces of excited-light sources being directed in 27 directions, the excited-light sources being directly coupled to an outer peripheral face of said doughnut- or deformed-doughnut-type planar waveguide so as to make excited lights propagate from the outer peripheral face of said doughnut- or deformed-doughnut-type planar waveguide to said plate-shaped gain medium;
   wherein the excited lights coming from said 27 pieces of excited-light sources being directed in 27 directions are caused to fall on the outer peripheral face of said doughnut- or deformed-doughnut-type planar waveguide at such an angle that turns a space distribution of absorption intensities of said excited lights resulting from said plate-shaped gain medium into a shape of Gaussian distribution that approximates a TEM00 mode.

3. The solid laser apparatus as set forth in claim 1, wherein said excited-light sources are made by joining a bare chip-type semiconductor laser to a water-cooled heatsink, respectively, after mounting the bare chip-type semiconductor laser onto a Cu—W submount having a smaller volume.

4. The solid laser apparatus as set forth in claim 1 further comprising an angle changing means for changing an incident angle of the excited lights coming from said excited-light sources toward the outer peripheral face of said doughnut- or deformed-doughnut-type planar waveguide.

5. The solid laser apparatus as set forth in claim 1, wherein said plate-shaped gain medium is made by doping a predetermined area in a disk-shaped host material with active ions.

6. The solid laser apparatus as set forth claim 1, wherein said excited-light sources are a semiconductor-chip laser, respectively.

7. The solid laser apparatus as set forth in claim 1, wherein:
   said plate-shaped gain medium has a thickness of less than 1,000 μm;
   a total-reflection element, one of said two reflection elements, is formed on one of facing opposite planes of said plate-shaped gain medium; and
   an outer face of said total-reflection element is brought into contact with a heatsink.

8. The solid laser apparatus as set forth in claim 2, wherein said excited-light sources are made by joining a bare chip-type semiconductor laser to a water-cooled heatsink, respectively, after mounting the bare chip-type semiconductor laser onto a Cu—W submount having a smaller volume.

9. The solid laser apparatus as set forth in claim 2 further comprising an angle changing means for changing an incident angle of the excited lights coming from said excited-light sources toward the outer peripheral face of said doughnut- or deformed-doughnut-type planar waveguide.

10. The solid laser apparatus as set forth in claim 2, wherein said plate-shaped gain medium is made by doping a predetermined area in a disk-shaped host material with active ions.

11. The solid laser apparatus as set forth in claim 2, wherein said excited-light sources are a semiconductor-chip laser, respectively.

12. The solid laser apparatus as set forth in claim 2, wherein:
   said plate-shaped gain medium has a thickness of less than 1,000 μm;
   a total-reflection element, one of said two reflection elements, is formed on one of facing opposite planes of said plate-shaped gain medium; and
   an outer face of said total-reflection element is brought into contact with a heatsink.

* * * * *